UNITED STATES PATENT OFFICE.

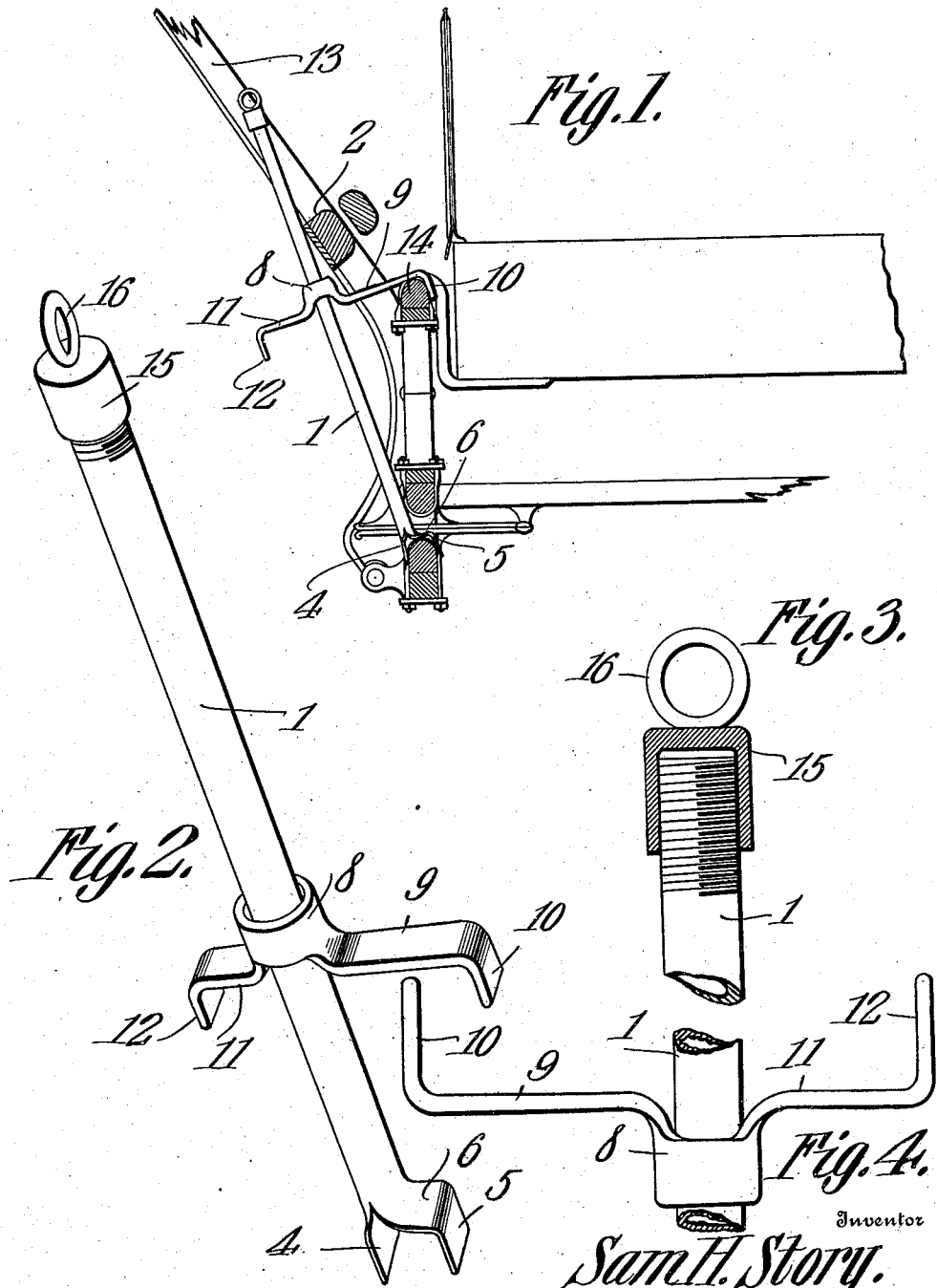

SAM H. STORY, OF NAPLES, TEXAS.

THILL-SUPPORT.

No. 911,775.   Specification of Letters Patent.   Patented Feb. 9, 1909.

Application filed June 20, 1908. Serial No. 439,600.

*To all whom it may concern:*

Be it known that I, SAM H. STORY, a citizen of the United States, residing at Naples, in the county of Morris and State of Texas, have invented a new and useful Thill-Support, of which the following is a specification.

This invention relates to thill supports, such as are used for temporarily supporting the thills or tongue of a vehicle in an elevated position when not in use.

One object of the present invention is to provide a device capable of supporting the thills without having the weight thrown upon the circle or fifth wheel.

Another object is to provide a device which may be quickly adjusted to vehicles of different forms of construction and applicable to different parts of the vehicle. And still another object is to so construct the supporting bracket that it may be readily adjusted to engage the springs or other portion of the vehicle from above or below.

With these and other objects in view as will more fully hereinafter appear, the present invention consists in certain novel details of construction and arrangement of parts, hereinafter fully described, illustrated in the accompanying drawings, and particularly pointed out in the appended claims. It being understood that various changes in the form proportion, size and minor details of the device may be made without departing from the spirit or sacrificing any of the advantages of the invention.

In the accompanying drawings forming a part of this specification, Figure 1 is a side elevation of a portion of the forward end of a vehicle showing a portion of the running gear and thills in section with the device applied. Fig. 2 is a perspective view of the device. Fig. 3 is a view of one end partly in section and disclosing the supporting member. Fig. 4 is a side elevation of the supporting bracket reversed.

Similar numerals of reference are employed to designate corresponding parts throughout.

In the construction illustrated the numeral 1 designates a metallic bar of a length sufficient to extend from the forward end of the running gear of a vehicle upward and beyond the cross bar 2 of the thills when the latter are elevated as shown in Fig. 1. The bar is at one end longitudinally divided so as to form jaws 4, and 5, the former of which lies in a plane with the bar 1 and the latter at its inner end is turned outwardly at substantially right angles to the bar 1 so as to form a shoulder 6 terminating in a portion turned forwardly and parallel to the jaw 4. With this construction it is obvious that a substantially U-shaped socket has been formed adapted to straddle the front axle of a vehicle.

The bracket employed to engage the upper side of the forward spring or cross bar of the vehicle and maintain the bar 1 in supporting position, is herein shown to consist of a metallic collar or sleeve 8, provided on its outer face and at one end with a pair of oppositely extending arms 9 and 11. The latter are disposed at right angles to the collar and terminate in bent portions constituting hooks 10 and 12. The collar or sleeve is of a diameter to slidingly fit over the bar 1 and the arms 9 and 11 are of unequal length in order that the thills may be supported at different angles. This construction will be found advantageous when vehicles are stored in closures insufficiently high to allow the thills to be raised to their full extent.

To use the device thus far described the thills 13 are first elevated as shown in Fig. 1, the bar 1 is then applied so that its lower end having the U-shaped socket, will straddle the front axle. This will bring the upper portion of the bar in front of the thill cross bar 2; the bracket is now adjusted on the bar 1 to bring the described arm and hook to bear respectively on the upper side and rear face of the vehicle cross bar or spring. By referring now to Fig. 4 it will be seen that the bracket has been reversed and the hooks extending in the opposite direction to that illustrated in Figs. 1 and 2 will engage the cross bar 14 of the vehicle from its lower face or opposite to that illustrated in Fig. 1 thereby preventing abrasion of the part 14, the advantage of this construction will be readily appreciated when applying the device to buggies and similar vehicles having highly varnished running gear. The end of the bar 1 opposite the socket end is provided with a thread which fits an internally threaded nipple 15, to the outer end of which is secured an eye fastening 16 by means of which the device may be hung when not in use. The nipple 15 further serves the purpose of preventing the bracket from accidentally falling from that end of the bar.

What is claimed is:—

1. A support for vehicle thills comprising a bar to engage the running gear of a vehicle, a sliding bracket combined with said bar having radial arms of unequal length terminating in hook portions bent at substantially right angles to said arms.

2. A support for vehicle thills comprising a bar to engage the running gear of a vehicle, a sliding collar encircling said bar having diametrically opposed arms terminating in hook portions bent at substantially right angles to said arms.

3. A support for vehicle thills comprising a bar having at one end a substantially U-shaped socket to straddle a portion of the running gear of a vehicle, a sliding bracket encircling said bar having vehicle engaging hooks to maintain said bar in thill supporting position.

4. A support for vehicle thills comprising a bar having at one end a substantially U-shaped socket one wall of which is provided at its base with a lateral shoulder, a reversible bracket on said bar provided with hooks to engage the vehicle proper above the socket portion and serving to maintain said bar in thill supporting position.

In testimony that I claim the foregoing as my own, I have hereto affixed my signature in the presence of two witnesses.

SAM H. STORY.

Witnesses:
  SAM. W. ROBISON,
  WM. B. HAZEL.